United States Patent
Yamaji et al.

(10) Patent No.: US 8,687,876 B2
(45) Date of Patent: Apr. 1, 2014

(54) STEREOSCOPIC IMAGE PASTING SYSTEM, AND METHOD AND PROGRAM FOR CONTROLLING OPERATION OF SAME

(75) Inventors: Kei Yamaji, Tokyo (JP); Atsushi Misawa, Tokyo (JP); Shuji Ono, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 360 days.

(21) Appl. No.: 13/231,580

(22) Filed: Sep. 13, 2011

(65) Prior Publication Data

US 2012/0076398 A1    Mar. 29, 2012

(30) Foreign Application Priority Data

Sep. 28, 2010    (JP) .................. 2010-217302
Aug. 1, 2011    (JP) .................. 2011-168381

(51) Int. Cl.
*G06K 9/00* (2006.01)
*G06K 9/32* (2006.01)
*G06K 9/54* (2006.01)

(52) U.S. Cl.
USPC .................. 382/154; 382/298; 382/305

(58) Field of Classification Search
USPC .................. 382/154, 298, 305
See application file for complete search history.

(56) References Cited

U.S. PATENT DOCUMENTS

| | | | |
|---|---|---|---|
| 6,384,859 B1 * | 5/2002 | Matsumoto et al. | 348/43 |
| 6,694,882 B2 * | 2/2004 | Baba et al. | 101/483 |
| 8,369,607 B2 * | 2/2013 | Mashitani et al. | 382/154 |
| 8,559,703 B2 * | 10/2013 | Mashitani et al. | 382/154 |
| 2006/0133664 A1 * | 6/2006 | Hong et al. | 382/154 |
| 2010/0039504 A1 * | 2/2010 | Takahashi et al. | 348/54 |
| 2011/0103680 A1 * | 5/2011 | Mashitani et al. | 382/154 |

FOREIGN PATENT DOCUMENTS

| | | |
|---|---|---|
| JP | 4259913 | 2/2009 |
| JP | 2009-223764 | 10/2009 |
| JP | 2010-045584 | 2/2010 |

* cited by examiner

*Primary Examiner* — Utpal Shah
(74) *Attorney, Agent, or Firm* — Young & Thompson

(57) ABSTRACT

It is arranged so that stereoscopic images will not overlap one another. A stereoscopic image to be pasted in a free-layout electronic album is selected. The amount of parallax of the stereoscopic image to be pasted in this electronic album is set. When this is done, the selected stereoscopic image is enlarged or reduced in size so as to take on the set amount of parallax. Automatic layout for pasting enlarged or reduced stereoscopic images on each page of the electronic album in such a manner that these stereoscopic images will not overlap one another is carried out. The result of the layout is displayed.

14 Claims, 15 Drawing Sheets

*Fig. 10*
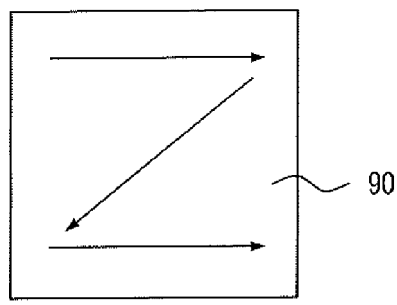
*Fig. 11A*  *Fig. 11B*
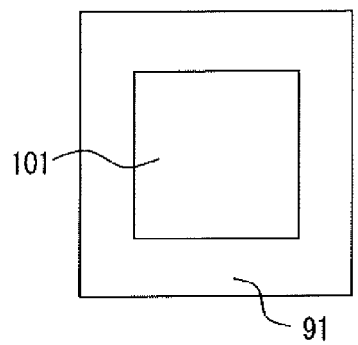 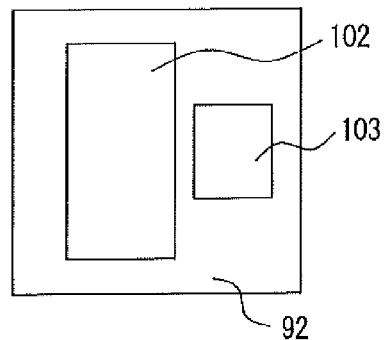
*Fig. 12*
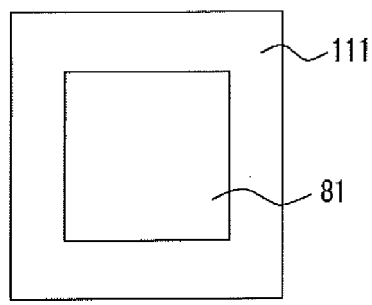
*Fig. 13*
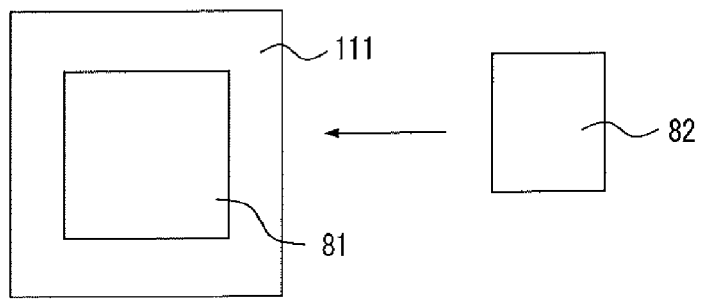

*Fig. 18*
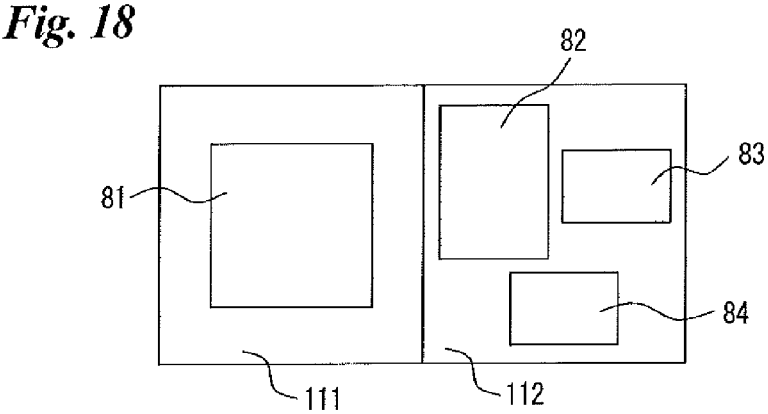
*Fig. 19*
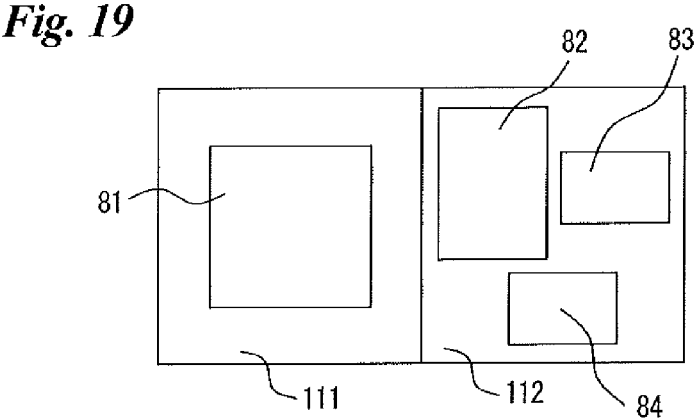
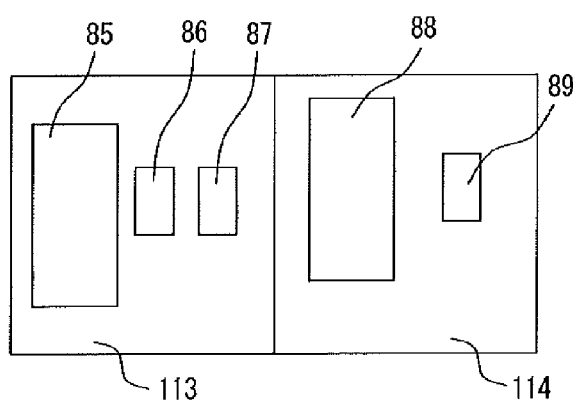

STEREOSCOPIC IMAGE PASTING SYSTEM, AND METHOD AND PROGRAM FOR CONTROLLING OPERATION OF SAME

BACKGROUND OF THE INVENTION

1. Field of the Invention

This invention relates to a stereoscopic image pasting system and to a method and program for controlling the operation of this system.

2. Description of the Related Art

There is a technique in which a layout is decided automatically when an electronic album is created utilizing a computer (see Japanese Patent Application Laid-Open No. 2009-223764). Further, since the amount of stereoscopic pop-up (depth perception) of a stereoscopic image is not uniquely decided when a stereoscopic image is displayed, there is a technique for adjusting the amount of pop-up (see Japanese Patent Application Laid-Open No. 2010-45584). Since the amount of pop-up varies depending upon enlargement and reduction of image size, there is a technique for determining whether a changed amount of pop-up falls within parallax limits (see Japanese Patent No. 4259913).

There is a presumption that the images pasted into an electronic album are two-dimensional images. No consideration has been given to the pasting of stereoscopic images in such an album. In a case where stereoscopic images are pasted in an electronic album, there are instances where pasted stereoscopic images will overlap each other if there is a change in amount of parallax. This problem arises not only in an electronic album but also in cases where a plurality of stereoscopic images are pasted on a mount image such as a postcard.

SUMMARY OF THE INVENTION

An object of the present invention is to so arrange it that stereoscopic images will not overlap when the stereoscopic images are pasted on a mount image.

A stereoscopic image pasting system according to the present invention comprises: a first selecting device (first selecting means) for selecting a plurality of stereoscopic images; an adjusting device (adjusting means) for enlarging or reducing the plurality of stereoscopic images, which have been selected by the first selecting device, so as to take on a common amount of parallax (pop-up); and a stereoscopic image pasting device (stereoscopic image pasting means) for pasting the plurality of stereoscopic images, which have been enlarged or reduced by the adjusting device, on a mount image so as not to overlap one another.

The present invention also provides an operation control method suited to the above-described stereoscopic image pasting system. Specifically, the present invention provides a method of controlling operation of a stereoscopic image pasting system, comprising the steps of: selecting a plurality of stereoscopic images; enlarging or reducing the selected plurality of stereoscopic images so as to take on a common amount of parallax; and pasting the plurality of stereoscopic images, which have been enlarged or reduced, on a mount image so as not to overlap one another.

The present invention further provides a computer-readable program for implementing the above-described method of controlling operation of a stereoscopic image pasting system. It may also be arranged to provide a recording medium on which this program has been stored.

In accordance with the present invention, a plurality of stereoscopic images to be pasted on a mount image (a single frame of a plain or ornamental image or a template, wherein one page or a plurality of pages constituting an electronic album may be a mount image or images, as will be described later) are selected. The plurality of stereoscopic images selected are enlarged or reduced in size so as to take on a common amount of parallax (e.g., an amount of parallax of a stereoscopic image that has been defined for a mount image). The plurality of stereoscopic images that have been enlarged or reduced are pasted on the mount image so as not to overlap one another. Even if the stereoscopic images are enlarged or reduced so as to take on the amount of parallax defined for the mount image, the stereoscopic images after enlargement or reduction will not overlap one another. This makes it easy to view the stereoscopic images.

The first selecting device selects a plurality of stereoscopic images to be pasted in an electronic album formed from a plurality of pages. In this case, the mount image on which the plurality of stereoscopic images are pasted by the stereoscopic image pasting device would be one or a plurality of pages constituting the electronic album.

The stereoscopic image pasting device pastes stereoscopic images on pages in ascending order thereof, by way of example. The system further comprises a second selecting device (second selecting means) for selecting any one stereoscopic image from among the plurality of stereoscopic images enlarged or reduced by the adjusting device; and a determination device (determination means) for determining whether a blank area in which the one stereoscopic image selected by the second selecting device can be pasted so as not to overlap another stereoscopic image exists on the page. Further, in response to a determination by the determination device that the blank area exists, the stereoscopic image selected by the second selecting device is pasted in the blank area. The system further comprises a control device (control means) for repeating the selection by the second selecting device and the determination processing by the determination device.

The stereoscopic image pasting device pastes the stereoscopic image selected by said second selecting device on the next page in response to a determination by said determination device that the blank area does not exist, for example.

The stereoscopic image pasting device may comprise a reduction device (reduction means) for reducing a stereoscopic image pasted on the page, which is determined that the blank area does not exist, in response to a determination by the determination device that the blank area does not exist.

The stereoscopic image pasting device pastes the stereoscopic image selected by the second selecting device on a generated blank area when an amount of parallax of the stereoscopic image reduced by the reduction device is larger than a prescribed threshold value and the blank area is generated by the reduction device in the page, for example.

The stereoscopic image pasting device pastes the stereoscopic image on the mount image so as to close portions of the stereoscopic images which have large amount of parallax.

The page is a spread, and wherein the stereoscopic image pasting device pastes the stereoscopic image on the page so that the part where the amount of the parallax is large becomes inside, for example.

The adjusting device may enlarge or reduce the plurality of stereoscopic images so that the amount of parallax of a prescribed object included in the plurality of stereoscopic image selected by the first selecting device becomes common.

The system may comprise a control device (control means) for controlling the amount of parallax of the stereoscopic image, which does not include the prescribed object, to zero.

The system according to claim 9, wherein the prescribed object is decided per each page, for example.

The system further comprises a parallax-amount setting device (parallax-setting means) for setting the common amount of parallax.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 illustrates the order of layout of stereoscopic images on a page;

FIGS. 11A and 11B illustrate the manner in which stereoscopic images are pasted on pages;

FIGS. 12 to 19 illustrate the manner in which stereoscopic images are pasted on pages.

DESCRIPTION OF THE PREFERRED EMBODIMENT

A preferred embodiment of the present invention will be described in detail with reference to the drawings.

First, the fact that amount of parallax is increased (decreased) by enlarging (reducing) the size of a stereoscopic image will be described.

Figure 1A:
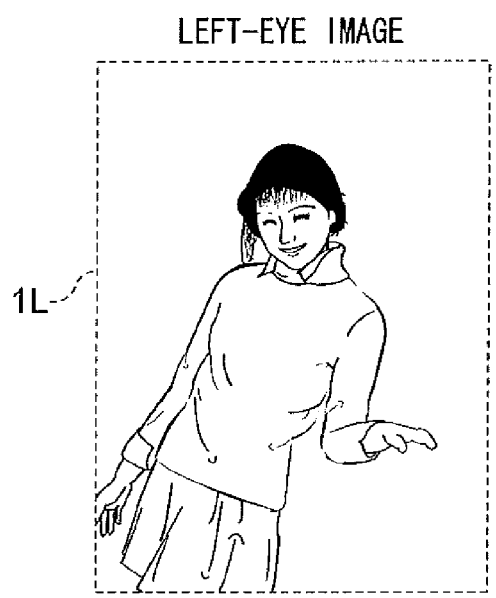
FIGS. 1A and 1B illustrate a left-eye image and a right-eye image, respectively.
Figure 1B:

FIG. 1A illustrates a rectangular left-eye image 1L and FIG. 1B illustrates a rectangular right-eye image 1R.

In a case where a stereoscopic image is displayed, the left-eye image 1L, which is observed by the left eye of the observer, and the right-eye image 1R, which is observed by the right eye of the observer, are required. If the left-eye image 1L and right-eye image 1R are superimposed upon being offset from each other in the horizontal direction, then the result is a stereoscopic image. The amount of horizontal offset in the horizontal direction is the amount of parallax.

Figure 2:
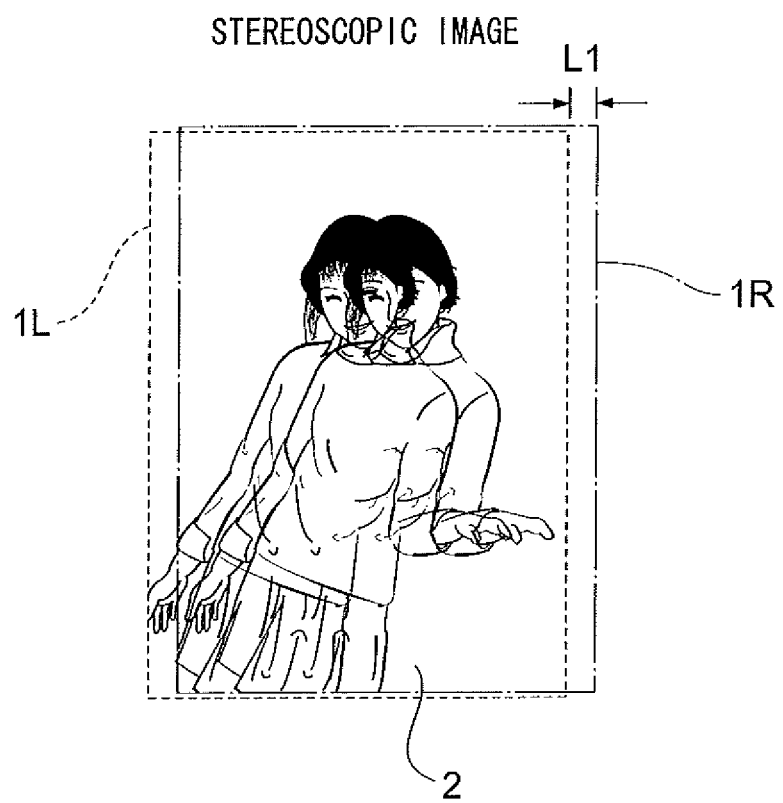
FIG. 2 illustrates an example of a stereoscopic image.

FIG. 2 illustrates the stereoscopic image.

If the left-eye image 1L and right-eye image 1R are superimposed upon being offset from each other in the horizontal direction in the manner described above, then the observer can view a portion 2, where the two images have been superimposed, as a stereoscopic image.

A parallax amount L1 has been assigned beforehand to the stereoscopic image formed from the left-eye image 1L and right-eye image 1R.

Figure 3:
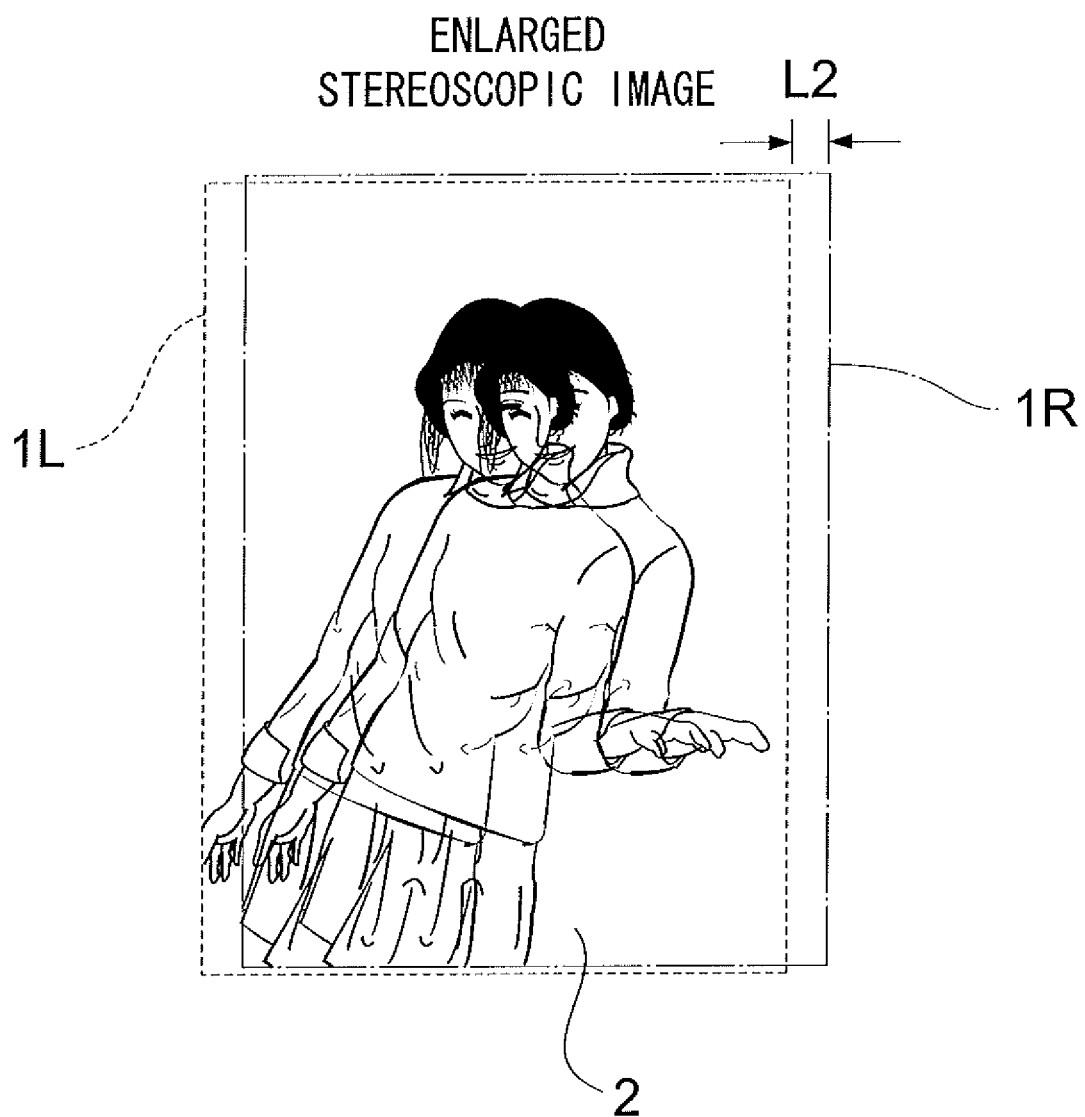
FIG. 3 illustrates an example of a stereoscopic image enlarged in size.

FIG. 3 illustrates the stereoscopic image enlarged in size.

When the stereoscopic image (left-eye image 1L, right-eye image 1R) is enlarged in size, the amount of parallax increases (parallax amount L2>parallax amount L1). This means that not only is the amount of parallax increased by separating the left-eye image 1L and right-eye image 1R from each other in the horizontal direction, but it can also be increased by enlarging the left-eye image 1L and right-eye image 1R in size. Further, the amount of parallax can be decreased similarly by reducing the left-eye image 1L and right-eye image 1R in size.

However, when the amount of parallax is changed by enlarging or reducing stereoscopic images in size after the stereoscopic images have been pasted in an electronic album, there are instances where stereoscopic image overlap each other. This embodiment arranges it so that stereoscopic images will not overlap each other.

Figure 4:
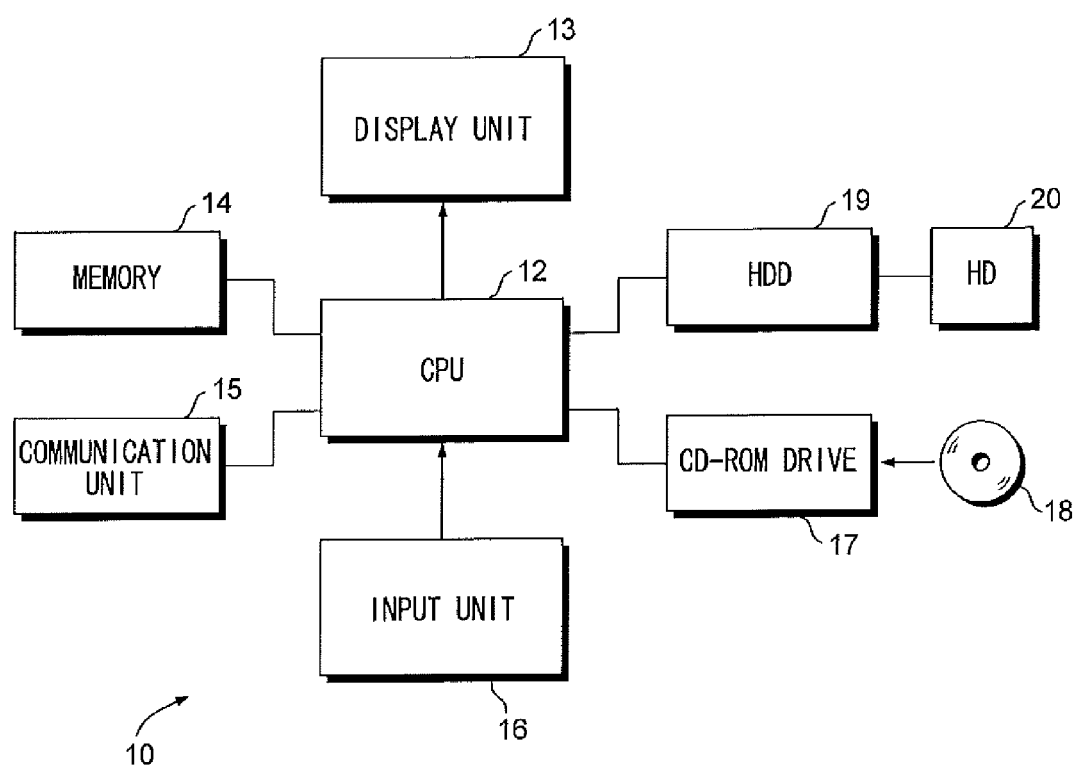
FIG. 4 is a block diagram illustrating the electrical configuration of a personal computer.

FIG. 4 is a block diagram illustrating the electrical configuration of a personal computer 10 according to an embodiment of the present invention. In this embodiment, the personal computer 10 communicates with a server computer (not shown) via the Internet. While communicating with the server computer, the user creates an electronic album using the personal computer 10. Naturally, the user may generate an electronic album without communicating with the server computer and is also capable of generating an electronic album utilizing a store terminal, which has been installed at a supermarket or convenience store, etc., without using the personal computer 10. In this case, the store terminal would have the electrical configuration shown in FIG. 4.

The overall operation of the personal computer 10 is controlled by a CPU 12.

The personal computer 10 includes a display unit 13, a memory 14, a communication unit 15 for communicating with a server computer, and an input unit 16 such as a keyboard and mouse. The personal computer 10 includes a hard disk 20 on which data such as image data representing a number of images has been recorded, and a hard-disk drive 19 for accessing the hard disk 20. The personal computer 10 further includes a CD-ROM drive 17 that accesses a CD-ROM 18 in which has been stored a program for controlling operation described below. The program that has been stored in the CD-ROM 18 is read by the CD-ROM drive 17 and the read program is installed in the personal computer 10, thereby allowing the personal computer 10 to operate in the manner described below. Naturally, it may be so arranged that even if the operation program is not stored on a recording medium such as the CD-ROM 18 removably inserted into the personal computer 10, the program can still be downloaded to the personal computer 10 via a network and installed in the personal computer 10.

Figure 5:
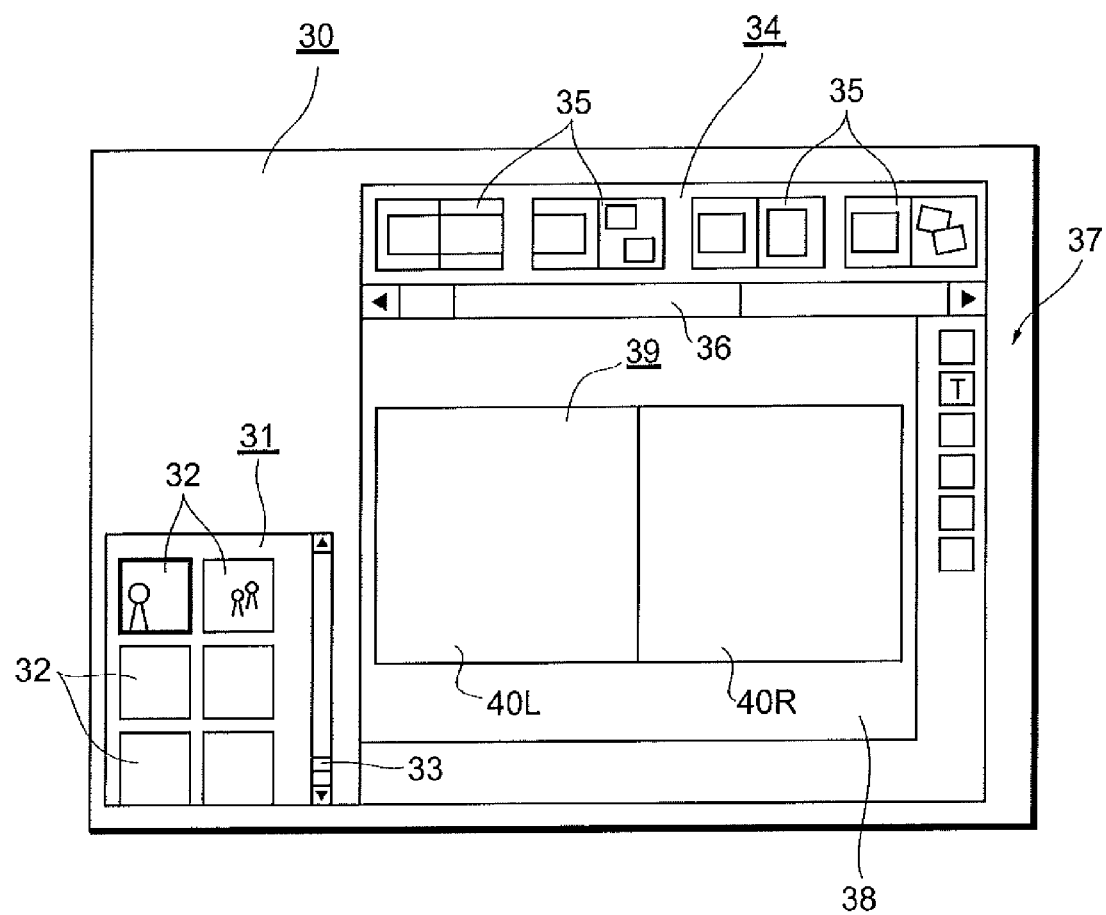
FIG. 5 is an example of an editing window.

FIG. 5 is an example of a window 30 for editing the electronic album.

Although processing for generating the electronic album will be described below, it will be assumed here that the personal computer 10 has already been connected to a server computer and that the electronic-album editing window 30 shown in FIG. 5 is being displayed on the display screen of the display unit 13 of the personal computer 10.

Formed at the lower-left portion of the editing window 30 is an image display area 31. The images (user images) 32 being displayed in the image display area 31 are represented by image data that has been stored on the hard disk 20. In a case where the electronic album is created using a store terminal, it goes without saying that the user brings a recording medium such as a memory card on which the image data has been recorded, reads the image data from the recording medium and displays the images, which are represented by the read image data, in the image display area 31. In such case the store terminal is provided with a memory card reader. A scroll button 33 is formed on the right side of the image display area 31. The scroll button 33 is moved freely up and down by a cursor (not shown). By moving the scroll button 33 up or down by the cursor, images that do not appear in the image display area 31 come into view in the image display area 31.

In this embodiment, stereoscopic images can be displayed in the electronic album, as mentioned above. The images 32 being displayed in the image display area 31 also are stereoscopic images.

Formed at the upper portion of the editing window 30 is a page display area 34 in which images 35 of pages constituting an electronic album are displayed. A scroll button 36 is formed beneath the page display area 34. The scroll button 36 also is freely movable to the left and right by a cursor (not shown). By moving the scroll button 36 to the left or right using the cursor, the images of pages that do not appear in the page display area 34 come into view in the page display area 36.

An editing area 38, which is for editing the pages that constitute the electronic album, is formed substantially over the entirety of the editing window 30. If the image of a desired page is selected (as by drag and drop) from among the images of the pages being displayed in the page display area 34, the image of the selected page will be displayed in the editing area 38. In this embodiment, it is assumed that a free-layout electronic album has been selected. As will be described later, a free-layout electronic album is one in which stereoscopic images are laid out automatically rather than image pasting areas being predetermined for each page of the album.

A left-side page 40L and a right-side page 40R constituting a free-layout electronic album are being displayed in the editing area 38. Formed on the right side of the editing window 30 are editing buttons 37 for adjusting amount of parallax, synthesizing text, deleting images and subjecting images to a color conversion.

Figure 6:
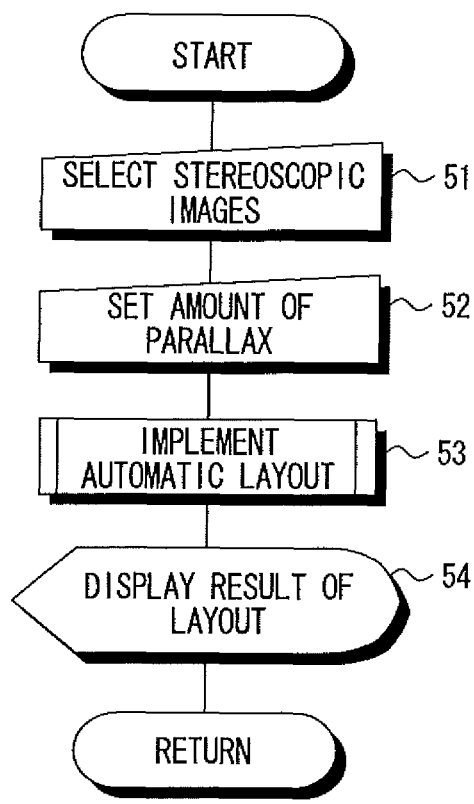
FIG. 6 is a flowchart illustrating processing for generating an electronic album.

FIG. 6 is a flowchart illustrating processing for generating an electronic album. It is assumed that a free-layout electronic album has already been selected.

A number of stereoscopic images to be pasted in an electronic album are selected by the user from among stereoscopic images being displayed in the image display area 31 (step 51).

Figure 7:
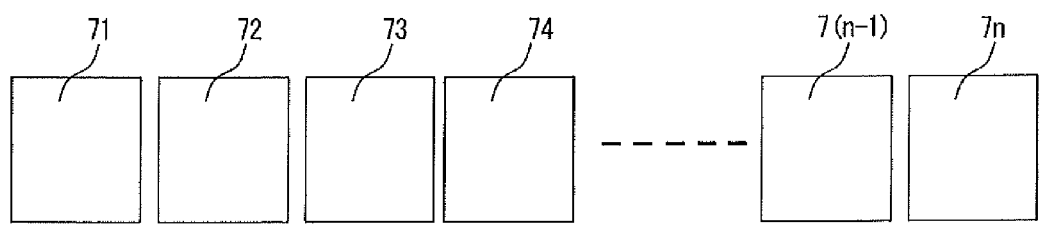
FIG. 7 is an example of selected stereoscopic image.

FIG. 7 illustrates an example of stereoscopic images that have been selected.

It is assumed that stereoscopic images 71 to 7n have been selected by the user.

With reference again to FIG. 6, a frame is displayed surrounding the selected stereoscopic images, by way of example. Next, the amount of parallax of stereoscopic images that will be pasted in the electronic album is set by the user (step 52). The amount of parallax of the stereoscopic images to be pasted in the electronic album is common for all of these stereoscopic images to be pasted. The amount of parallax may be set by designating the ratio of the transverse width of the stereoscopic images using the editing buttons 37, or a specific value may be designated using the editing buttons 37.

When the amount of parallax is set, automatic layout is implemented (step 53). Automatic layout will be described later.

When automatic layout is implemented, the result of the layout is displayed in the electronic-album editing window 30 (step 54).

Figure 8:
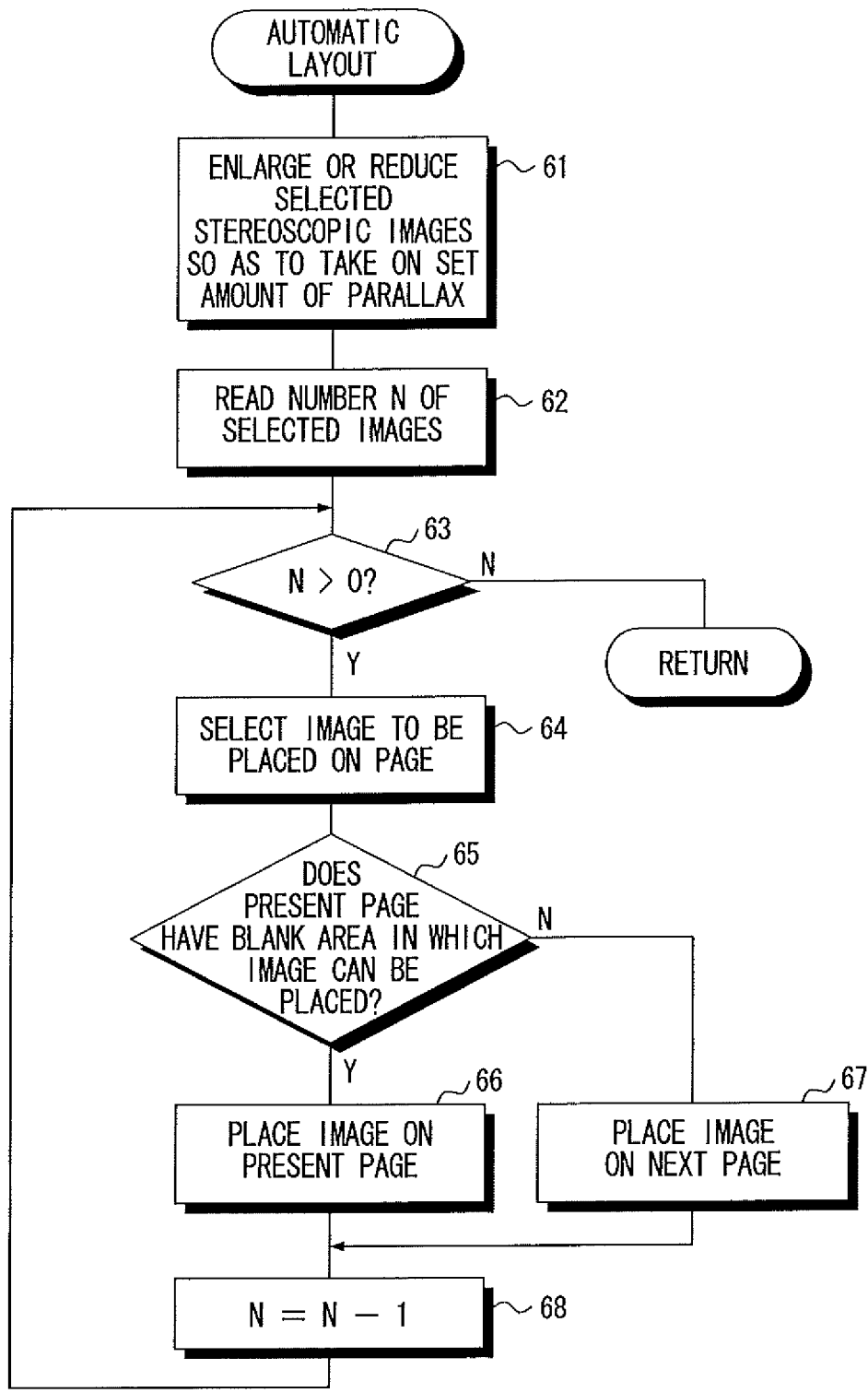
FIG. 8 is a flowchart illustrating automatic layout processing.

FIG. 8 is a flowchart illustrating automatic layout processing (the processing of step 53 in FIG. 6).

When the images 71 to 7n to be pasted in the electronic album are selected (see FIG. 7) and the amount of parallax is designated as described above, the selected stereoscopic images are enlarged or reduced in size so as to take on the amount of parallax that has been set (step 61). If the set amount of parallax is not attained by the enlargement or reduction in size, the stereoscopic images are adjusted so as to take on the set amount of parallax as by increasing or decreasing the offset between the left- and right-eye images constituting the stereoscopic images.

Figure 9:
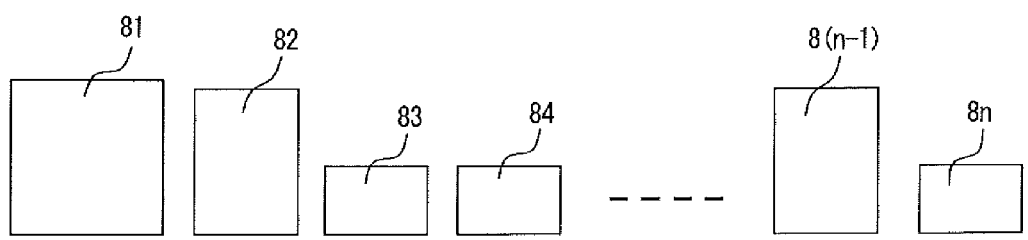
FIG. 9 is an example of stereoscopic images enlarged or reduced in size.

FIG. 9 illustrates stereoscopic images 81 to 8n adjusted to the set amount of parallax by enlarging or reducing the selected stereoscopic images 71 to 7n in size.

With reference again to FIG. 8, a number N of stereoscopic image selected by the user are read (step 62). If the number N of stereoscopic images is greater than zero ("YES" at step 63), then a stereoscopic image to be placed on the page is selected by the user (step 64). The stereoscopic images 81 to 8n enlarged or reduced in size are displayed in the image display area 31. It goes without saying that the stereoscopic images to be placed on the page are selected from among the stereoscopic images 81 to 8n being displayed in the image display area 31.

When the stereoscopic image to be placed on the page is selected, whether the present page has a blank area in which the selected stereoscopic image can be placed is determined (step 65).

If a blank area exists ("YES" at step 65), the selected stereoscopic image is placed on the present page (step 66). If a blank area does not exist ("NO" at step 65), then the selected stereoscopic image is placed on the next page (step 67).

The number N of selected images is decremented (step 68) and the processing from step 63 to step 68 is repeated.

When the number N of selected images becomes zero ("NO" at step 63), this means that all of the stereoscopic images selected by the user have been pasted in the electronic album. Automatic layout processing is therefore terminated.

FIG. 10 is an example of a page 90 constituting the electronic album.

If a plurality of stereoscopic images are pasted on the page 90, the stereoscopic images are pasted in order from upper left to upper right to lower left to lower right as indicated by the arrows.

FIGS. 11A and 11B illustrate examples of pasting positions of stereoscopic images.

If just a single stereoscopic image 101 is pasted on a page 91, as shown in FIG. 11A, this stereoscopic image 101 occupies the center of the page 91.

If a plurality of stereoscopic images 102 and 103 are pasted on a page 92, as shown in FIG. 11B, then the center of gravity of these stereoscopic images 102 and 103 approaches the center of the page 92 without the stereoscopic images 102 and 103 overlapping each other.

FIGS. 12 to 19 illustrate the manner in which selected stereoscopic images are laid out automatically.

With reference to FIG. 12, when the stereoscopic image 81 is selected in a case where the present page is a page 111, a blank area in which the stereoscopic image 81 can be pasted exists on the page 111 and, hence, the stereoscopic image 81 is pasted on the page 111.

With reference to FIG. 13, assume that a stereoscopic image 82 is selected as the next stereoscopic image in a case where the stereoscopic image 81 has been pasted on the page 111. In this case, a blank area in which the stereoscopic image 82 can be pasted does not exist on the page 111.

Figure 14:
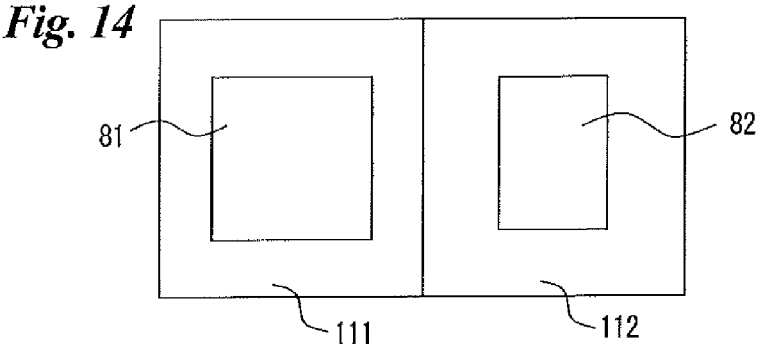

With reference to FIG. 14, the stereoscopic image 82 is pasted on a page 112, which is the page that follows page 111.

Figure 15:
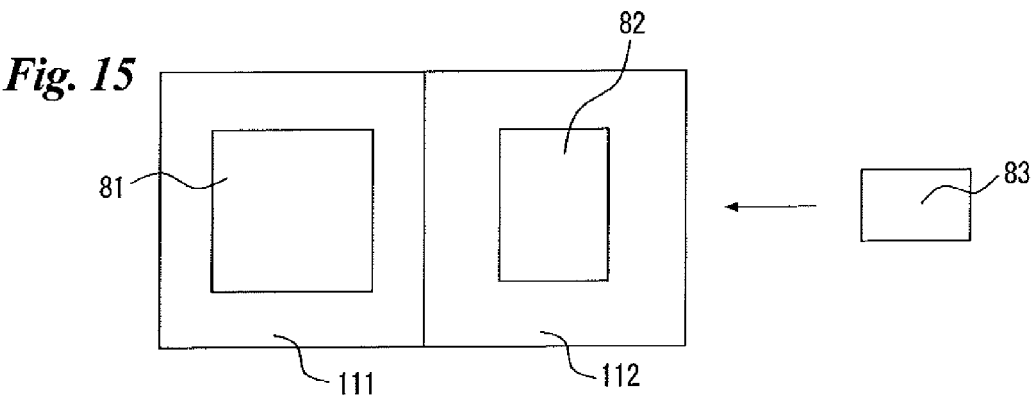

With reference to FIG. 15, assume that a stereoscopic image 83 is selected in a case where the stereoscopic image 82 has been pasted on the page 112.

Figure 16:
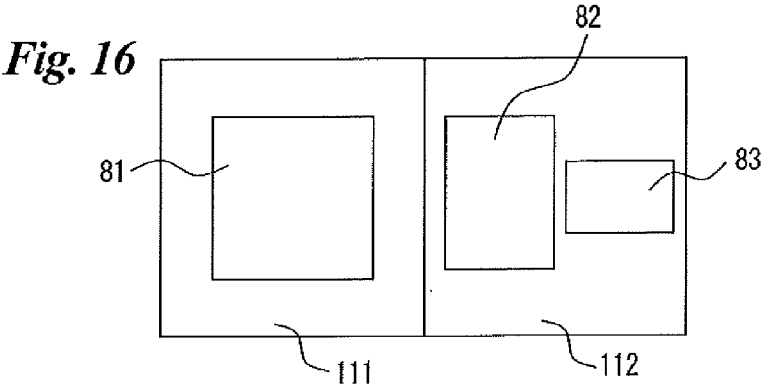

With reference to FIG. 16, since the page 112 has a blank area in which the stereoscopic image 83 can be pasted, the stereoscopic image 83 is pasted on the page 112.

Figure 17:
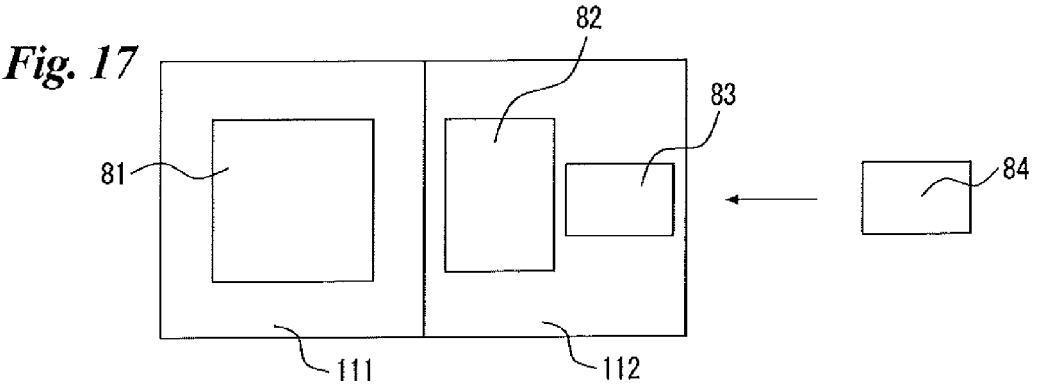

With reference to FIG. 17, assume that stereoscopic image 84 is selected in a case where the stereoscopic images 82 and 83 have been pasted on the page 112.

With reference to FIG. 18, since the page 112 has a blank area in which the stereoscopic image 84 can be pasted, the stereoscopic image 84 is pasted on the page 112.

Thus, a selected stereoscopic image and the blank area of a page are compared and the stereoscopic image is pasted in the blank area. Stereoscopic images 81 to 89, etc., are pasted on the pages 111 to 114 (automatically laid out) as illustrated in FIG. 19.

In the above-described embodiment, a plurality of stereoscopic images are pasted in an electronic album formed from a plurality of pages. However, it may be arranged so that a plurality of stereoscopic images are pasted on a mount image such as a postcard. In this case also a common amount of parallax can be adopted for the plurality of stereoscopic images pasted on the mount image.

Further, the present invention is applicable also to a slideshow composed of a plurality of frames rather than to an electronic album. A plurality of stereoscopic images can be pasted into a plurality of frames constituting a slideshow and a common amount of parallax can be adopted for the plurality of stereoscopic images.

Figure 20:
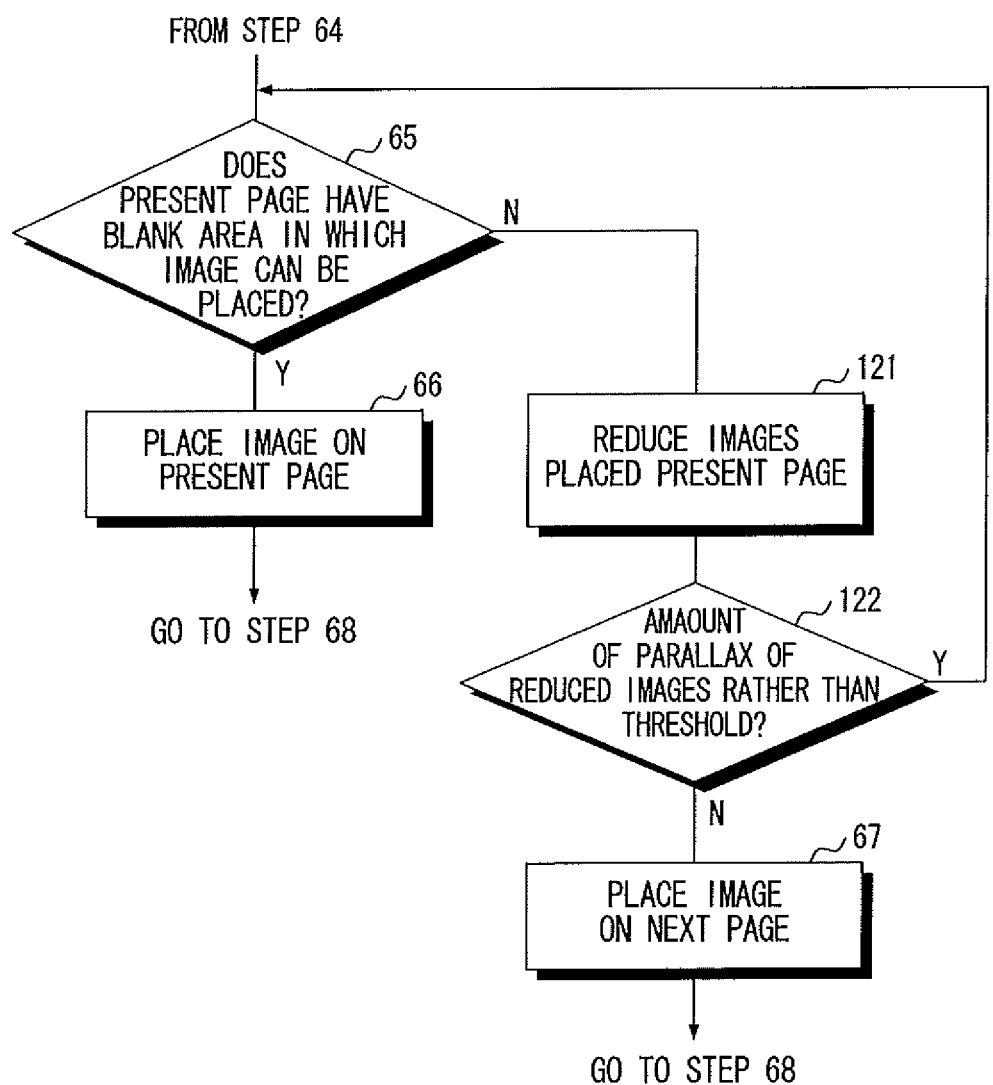
FIG. 20 is a flowchart illustrating a part of automatic layout processing.

FIG. 20 is a flowchart illustrating a part of automatic layout processing of FIG. 8 according to a modified embodiment of the present invention. Processing steps in FIG. 20 identical with those shown in FIG. 8 are designated by like step numbers and need not be described again.

In the embodiment of FIG. 8, in case the present page does not have the blank area (NO at step 65), the image is pasted on the next page (step 67). In this modified embodiment, in case the present page does not have the blank area (NO at step 65), the image pasted on the present page is reduced (step 121).

If the amount of parallax of the reduced image is larger than the prescribed threshold value (YES at step 122), when the blank area is generated by the reduction (YES step 65), the image is pasted the generated blank area (step 66). If the amount of parallax of the reduced image is not larger than the prescribed threshold value (NO at step 122), the image is pasted on the next page (step 67). In case the image is pasted on the next page, the size of the reduced image may return the original size.

Figure 21:
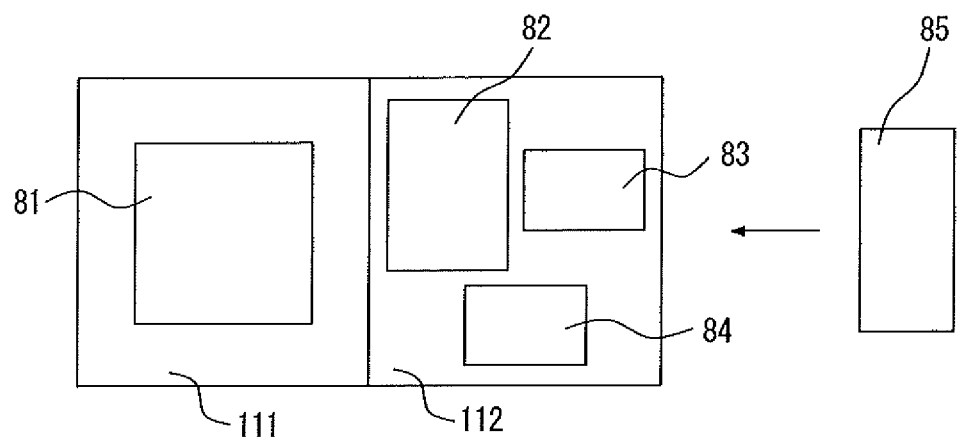
FIGS. 21 to 24 illustrate the manner in which stereoscopic images are pasted on pages.
Figure 22:
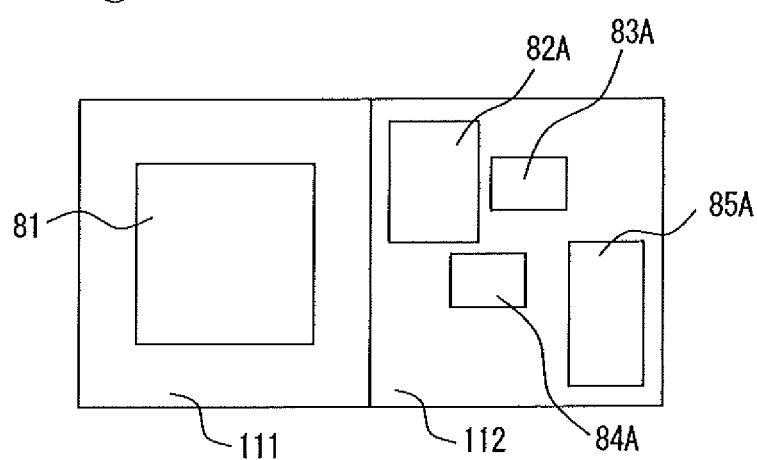

FIGS. 21 and 22 illustrate the manner in which the images 81 etc. are pasted on the pages 111, 112.

Referring to FIG. 21, the images 82 to 84 are pasted on the page 112 and the page 112 does not have the blank area to past the image 85. The images 82 to 85 pasted on the page 112 are reduced, mentioned above. The area including the images 82 to 84 may be regarded as one image, and may be reduced. As shown in FIG. 22, the images 82A to 84B, which are reduced from the images 82 to 84, are pasted on the page 112. Then, the blank area is generated on the page 112. The image 85 is also reduced (it is not necessary to be reduced), and the reduced image 85A is pasted on the page 112.

Figure 23:
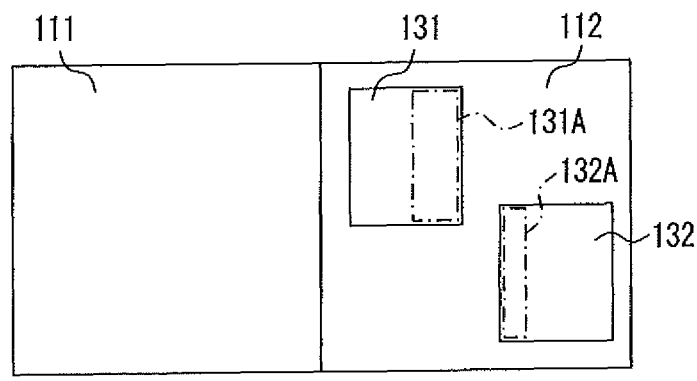
Figure 24:
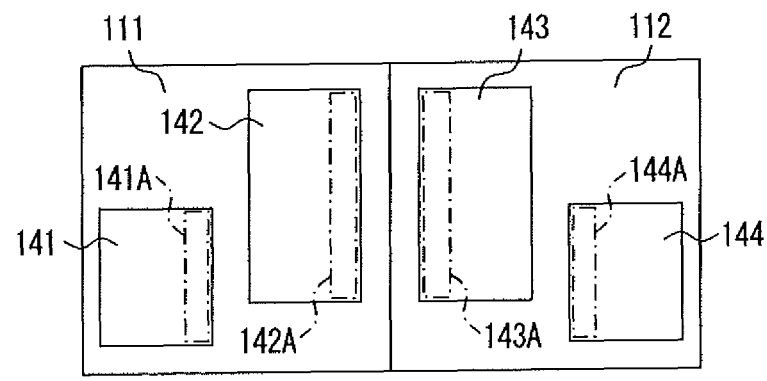

FIGS. 23 and 24 illustrate an example of an image arrangement. The amount of parallax of images considers, and the images are arranged.

The amount of parallax is not same in a frame of the image, and the part where the amount of parallax is large is included.

In the example of FIG. 23, the image is pasted so that the part where the amount of parallax is large becomes a center of each page.

Referring to FIG. 23, the images 131 and 132 are pasted on the page 112. The amount of parallax of the part 131A shown as short dashed lines is larger than the other part in the image 131. Similarly, the amount of parallax of the part 132A shown as short dashed lines in the image 132 is also large. The images 131 and 132 are arranged to close the parts 131A and 132A where the amount of parallax are large.

In FIG. 24, the images 141-144 are pasted on the pages 111 and 112 so that the part where the amount of parallax is large becomes inside of a two-page spread.

Referring to FIG. 24, the images 141 and 142 are pasted on the left page 111. The amount of parallax of a part 141A of the image 141 shown as short dashed lines and a part 142A of the image 142 shown as short dashed lines are larger than other portions, respectively. Therefore, the images 141 and 142 are pasted on the inside of a two-page spread so that the parts 141A and 142A are pasted on the right side of the page 111.

The images 143 and 144 are pasted on the right page 112. The amount of parallax of a part 143A of the image 143 shown as short dashed lines and a part 144A of the image 144 shown as short dashed lines are larger than other portions, respectively. Therefore, the images 143 and 144 are pasted on the inside of a two-page spread so that the parts 143A and 144A are pasted on the left side of the page 112.

Figure 25:
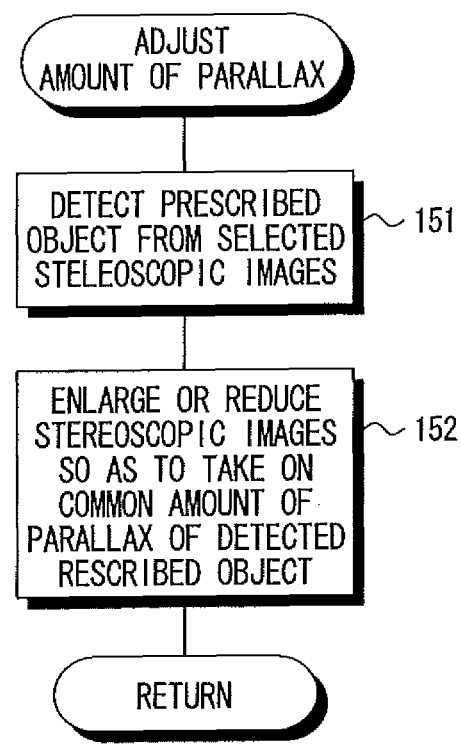
FIG. 25 is a flowchart illustrating processing for adjusting the amount of parallax.

FIG. 25 is a flowchart illustrating of the amount of parallax adjusting processing (the processing of step 61 in FIG. 8) according to a modified embodiment of the present invention.

First, a prescribed object is detected from the selected stereoscopic images (step 151). For example, a human image or an automobile image is detected. The stereoscopic images are enlarged or reduced in size so as to take on a common amount of parallax of the detected objects (step 152).

In this modified embodiments, since the amount of parallax of the prescribed object becomes common, a sense of incompatibility is not occured.

The prescribed object may be designated by the user by manual, and may be decided automatically each page. For example, the user can decide that the prescribed object of the first page is the human image, the prescribed object of the second page is the automobile image and the prescribed object of the third page is the object which has the largest the amount of parallax. Further, the amount of parallax of the stereoscopic image, which does not include the prescribed object, may be changed to zero.

As many apparently widely different embodiments of the present invention can be made without departing from the spirit and scope thereof, it is to be understood that the invention is not limited to the specific embodiments thereof except as defined in the appended claims.

What is claimed is:

1. A stereoscopic image pasting system comprising:
a first selecting device for selecting a plurality of stereoscopic images;
an adjusting device for enlarging or reducing the plurality of stereoscopic images, which have been selected by said first selecting device, so as to take on a common amount of parallax; and
a stereoscopic image pasting device for pasting the plurality of stereoscopic images, which have been enlarged or reduced by said adjusting device, on a mount image so as not to overlap one another.

2. The system according to claim 1, wherein said first selecting device selects a plurality of stereoscopic images to be pasted in an electronic album formed from a plurality of pages; and the mount image on which the plurality of stereoscopic images are pasted by said stereoscopic image pasting device is one or a plurality of pages constituting the electronic album.

3. The system according to claim 2, wherein said stereoscopic image pasting device further comprises:

a second selecting device for selecting any one stereoscopic image from among the plurality of stereoscopic images enlarged or reduced by said adjusting device; and a determination device for determining whether a blank area in which the one stereoscopic image selected by the second selecting device can be pasted so as not to overlap another stereoscopic image exists on the page;

the stereoscopic image selected by said second selecting device being pasted in the blank area in response to a determination by said determination device that the blank area exists;

said system further comprising a control device for repeating the selection by said second selecting device and the determination processing by said determination device.

4. The system according to claim 3, wherein said stereoscopic image pasting device pastes the stereoscopic image selected by said second selecting device on the next page in response to a determination by said determination device that the blank area does not exist.

5. The system according to claim 4, wherein said stereoscopic image pasting device further comprises:

a reduction device for reducing a stereoscopic image pasted on the page, which is determined that the blank area does not exist, in response to a determination by said determination device that the blank area does not exist.

6. The system according to claim 5, wherein said stereoscopic image pasting device pastes the stereoscopic image selected by said second selecting device on a generated blank area when an amount of parallax of the stereoscopic image reduced by said reduction device is larger than a prescribed threshold value and the blank area is generated by said reduction device in the page.

7. The system according to claim 1, wherein said stereoscopic image pasting device pastes the stereoscopic image on the mount image so as to close portions of the stereoscopic images which have large amount of parallax.

8. The system according to claim 2, wherein the page is a spread, and wherein said stereoscopic image pasting device pastes the stereoscopic image on the page so that the part where the amount of the parallax is large becomes inside.

9. The system according to claim 1, wherein said adjusting device enlarges or reduces the plurality of stereoscopic images so that the amount of parallax of a prescribed object included in the plurality of stereoscopic image selected by said first selecting device becomes common.

10. The system according to claim 9, further comprises:

a control device for controlling the amount of parallax of the stereoscopic image, which does not include the prescribed object, to zero.

11. The system according to claim 9, wherein the prescribed object is decided per page.

12. The system according to claim 1, further comprising a parallax-amount setting device for setting the common amount of parallax.

13. A method of controlling operation of a stereoscopic image pasting system, comprising the steps of:

selecting a plurality of stereoscopic images;

enlarging or reducing the selected plurality of stereoscopic images so as to take on a common amount of parallax; and pasting the plurality of stereoscopic images, which have been enlarged or reduced, on a mount image so as not to overlap one another.

14. A non-transitory computer-readable storage medium comprising a program for controlling a computer of a stereoscopic image pasting system so as to:

select a plurality of stereoscopic images;

enlarge or reduce the selected plurality of stereoscopic images so as to take on a common amount of parallax; and paste the plurality of stereoscopic images, which have been enlarged or reduced, on a mount image so as not to overlap one another.

* * * * *